US010067552B2

United States Patent
Chang et al.

(10) Patent No.: US 10,067,552 B2
(45) Date of Patent: Sep. 4, 2018

(54) TOUCH CONTROLLER APPARATUS AND A METHOD FOR WAKING UP AN ELECTRONIC DEVICE

(71) Applicant: HIMAX TECHNOLOGIES LIMITED, Tainan (TW)

(72) Inventors: Po-Yuan Chang, Tainan (TW); Li-Lin Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 197 days.

(21) Appl. No.: 14/792,179

(22) Filed: Jul. 6, 2015

(65) Prior Publication Data
US 2017/0010653 A1 Jan. 12, 2017

(51) Int. Cl.
G06F 1/32 (2006.01)
G06F 3/0488 (2013.01)
G06F 3/0346 (2013.01)
G06F 3/041 (2006.01)

(52) U.S. Cl.
CPC .......... *G06F 1/3262* (2013.01); *G06F 1/3215* (2013.01); *G06F 1/3243* (2013.01); *G06F 1/3265* (2013.01); *G06F 3/0346* (2013.01); *G06F 3/0416* (2013.01); *G06F 3/04883* (2013.01); *G06F 2203/04108* (2013.01); *Y02D 10/152* (2018.01); *Y02D 10/153* (2018.01)

(58) Field of Classification Search
CPC .............................. G06F 1/3262; G06F 1/3215
See application file for complete search history.

(56) References Cited

U.S. PATENT DOCUMENTS

2012/0071149 A1* 3/2012 Bandyopadhyay ... G06F 1/1643
455/418
2015/0002406 A1* 1/2015 Small ...................... G06F 3/041
345/173

FOREIGN PATENT DOCUMENTS

| CN | 103019796 | 4/2013 |
| CN | 104636169 | 5/2015 |
| TW | 201232364 | 8/2012 |

OTHER PUBLICATIONS

"Office Action of Taiwan Counterpart Application", dated Apr. 25, 2016, p. 1-p. 8, in which the listed references were cited.

* cited by examiner

*Primary Examiner* — Austin Hicks
(74) *Attorney, Agent, or Firm* — J.C. Patents (57) ABSTRACT

A touch controller apparatus configured to sense a gesture performed on an electronic device is provided. The touch controller apparatus includes a touch controller, a system controller, an accelerator sensor, and a proximity sensor. The touch controller is configured to operate in a smart idle mode. The system controller, the accelerator sensor and the proximity sensor are configured to operate in a deep sleep mode. The gesture wakes up the touch controller, and the touch controller wakes up the system controller. The system controller wakes up the accelerator sensor and the proximity sensor to generate a sensing data. The system controller controls the electronic device to change from the smart idle mode to a normal mode according to the sensing data. Furthermore, a method for waking up an electronic device is also provided.

10 Claims, 6 Drawing Sheets

TOUCH CONTROLLER APPARATUS AND A METHOD FOR WAKING UP AN ELECTRONIC DEVICE

BACKGROUND OF THE INVENTION

1. Field of the Invention

The invention generally relates to a controller apparatus and a method for enabling an electronic device, in particular, to a touch controller apparatus and a method for waking up an electronic device.

2. Description of Related Art

When an electronic device equipped with a touch screen suspends for a short time, the electronic device would go into a perset operation mode, such as a smart idle mode or a deep sleep mode, to reduce power consumption. Based on design requirements, users may wake up the electronic device by using some special gesture. Once the electronic device is woken up, the electronic device would go into a normal mode, and performs corresponding functions based on other gestures in the normal mode. This feature is friendly on handset devices. However, in some circumstances, the handset devices are undesirably woken up. For example, the handset devices may be erroneously triggered to wake up while the handset devices are put in pocket of pants or backpacks. Therefore, a method for suitably waking up the electronic device is necessary for the users.

SUMMARY OF THE INVENTION

Accordingly, the invention is directed to a touch controller apparatus and a method for waking up an electronic device capable of reducing erroneous determinations for waking up the electronic device.

An exemplary embodiment of the invention provides a touch controller apparatus configured to sense a gesture performed on an electronic device. The touch controller apparatus includes a touch controller, a system controller, and at least one sensor. The touch controller is configured to operate in a first mode. The system controller is electrically connected to the touch controller. The system controller is configured to operate in a second mode. The gesture wakes up the touch controller, and the touch controller wakes up the system controller. The at least one sensor is electrically connected to the system controller. The at least one sensor is configured to operate in the second mode. The system controller wakes up the at least one sensor to generate a sensing data. The system controller controls the electronic device to change from the first mode to a third mode according to the sensing data of the at least one sensor.

According to an exemplary embodiment of the invention, the at least one sensor includes at least one of an accelerator sensor and a proximity sensor. The system controller controls the electronic device to change from the first mode to the third mode according to the sensing data of the at least one of the accelerator sensor and the proximity sensor.

According to an exemplary embodiment of the invention, the gesture includes double taps. A first tap of the double taps wakes up the touch controller. The touch controller wakes up the system controller and the system controller wakes up the at least one sensor after the first tap of the double taps and before the second tap of the double taps.

According to an exemplary embodiment of the invention, the at least one sensor starts to generate the sensing data after the first tap of the double taps and before a second tap of the double taps.

According to an exemplary embodiment of the invention, the system controller controls the electronic device to change from the first mode to the third mode according to the sensing data of the at least one sensor after the second tap of the double taps.

According to an exemplary embodiment of the invention, the gesture is performed on the electronic device during a touch sensing period. The gesture wakes up the touch controller between a first period and a second period of the touch sensing period. The touch controller wakes up the system controller between the first period and the second period of the touch sensing period. The system controller wakes up the at least one sensor to generate the sensing data between the first period and the second period of the touch sensing period.

According to an exemplary embodiment of the invention, the system controller controls the electronic device to change from the first mode to the third mode according to the sensing data of the at least one sensor after the touch sensing period.

According to an exemplary embodiment of the invention, when the gesture wakes up the touch controller, the touch controller changes from the first mode to the third mode.

According to an exemplary embodiment of the invention, when the touch controller wakes up the system controller, the system controller changes from the second mode to the third mode. When the system controller wakes up the at least one sensor, the system controller changes from the second mode to the third mode.

According to an exemplary embodiment of the invention, the first mode is a smart idle mode, the second mode is a deep sleep mode, and the third mode is a normal mode.

An exemplary embodiment of the invention provides a method for waking up an electronic device. The electronic device includes a touch controller apparatus configured to sense a gesture performed on the electronic device. The touch controller apparatus includes a system controller, a touch controller, and at least one sensor. The method includes: waking up the touch controller operating in a first mode via the gesture; waking up the system controller operating in a second mode via the touch controller; waking up the at least one sensor operating in the second mode to generate a sensing data via the system controller; controlling the electronic device to change from the first mode to a third mode according to the sensing data of the at least one sensor via the system controller.

According to an exemplary embodiment of the invention, the at least one sensor includes at least one of an accelerator sensor and a proximity sensor. In the step of controlling the electronic device to change from the first mode to the third mode according to the sensing data of the at least one sensor via the system controller, the electronic device is controlled to change from the first mode to the third mode according to the sensing data of the at least one of the accelerator sensor and the proximity sensor.

According to an exemplary embodiment of the invention, the gesture includes double taps. The step of waking up the touch controller operating in the first mode via the gesture includes: waking up the touch controller operating in the first mode via a first tap of the double taps. The step of waking up the system controller operating in the second mode via the touch controller and the step of waking up the at least one sensor operating in the second mode to generate the sensing data via the system controller are performed after the first tap of the double taps and before the second tap of the double taps.

According to an exemplary embodiment of the invention, the at least one sensor starts to generate the sensing data after the first tap of the double taps and before a second tap of the double taps.

According to an exemplary embodiment of the invention, the step of controlling the electronic device to change from the first mode to the third mode according to the sensing data of the at least one sensor via the system controller is performed after the second tap of the double taps.

According to an exemplary embodiment of the invention, the gesture is performed on the electronic device during a touch sensing period. The step of waking up the touch controller operating in the first mode via the gesture, the step of waking up the system controller operating in the second mode via the touch controller, and the step of waking up the at least one sensor operating in the second mode to generate the sensing data via the system controller are performed between the first period and the second period of the touch sensing period.

According to an exemplary embodiment of the invention, the step of controlling the electronic device to change from the first mode to the third mode according to the sensing data of the at least one sensor via the system controller is performed after the touch sensing period.

According to an exemplary embodiment of the invention, when the gesture wakes up the touch controller, the touch controller changes from the first mode to the third mode.

According to an exemplary embodiment of the invention, when the touch controller wakes up the system controller, the system controller changes from the second mode to the third mode. When the system controller wakes up the at least one sensor, the system controller changes from the second mode to the third mode.

According to an exemplary embodiment of the invention, the first mode is a smart idle mode, the second mode is a deep sleep mode, and the third mode is a normal mode.

Based on the above, in the exemplary embodiments of the invention, the system controller controls the electronic device to change from the first mode to the third mode according to the sensing data of the at least one sensor. Accordingly, erroneous determinations for waking up the electronic device are reduced.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The disclosure is described below by means of a plurality of embodiments.

However, the disclosure is not limited to the illustrated embodiments. Further, the following embodiments may be adaptively combined, replaced or omitted under reasonable circumstances to meet different practical needs. Throughout the full context of the description and the claims, the word "couple" in the description and claims may refer to any direct or indirect connection. For instance, in the description and claims, if a first device is coupled to a second device, it means that the first device may be directly connected to the second device or may indirectly connected to the second device through another device or by another connection means. In addition, the word "signal" may refer to at least one current signal, voltage signal, electric charge signal, temperature signal, data signal or any one or more signals.

Figure 1:
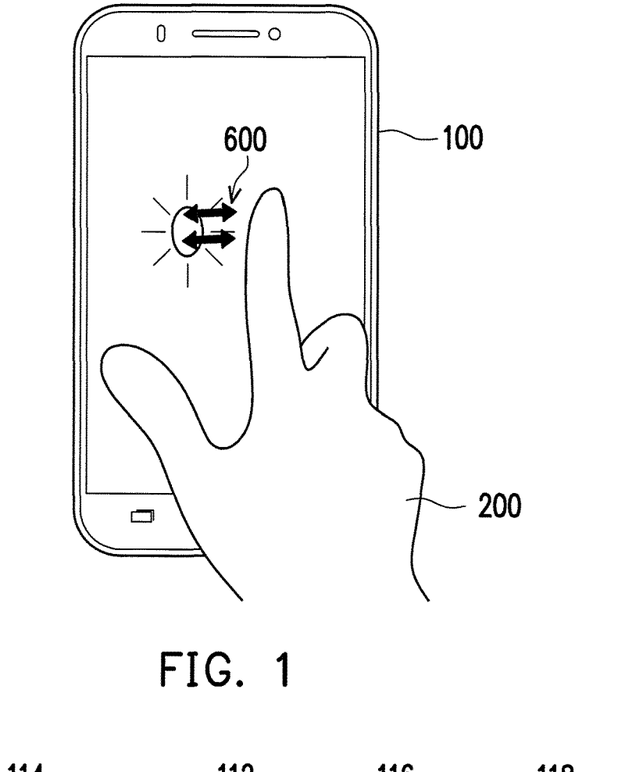
FIG. 1 illustrates a schematic diagram of a gesture for waking up an electronic device according to an exemplary embodiment.
Figure 2:
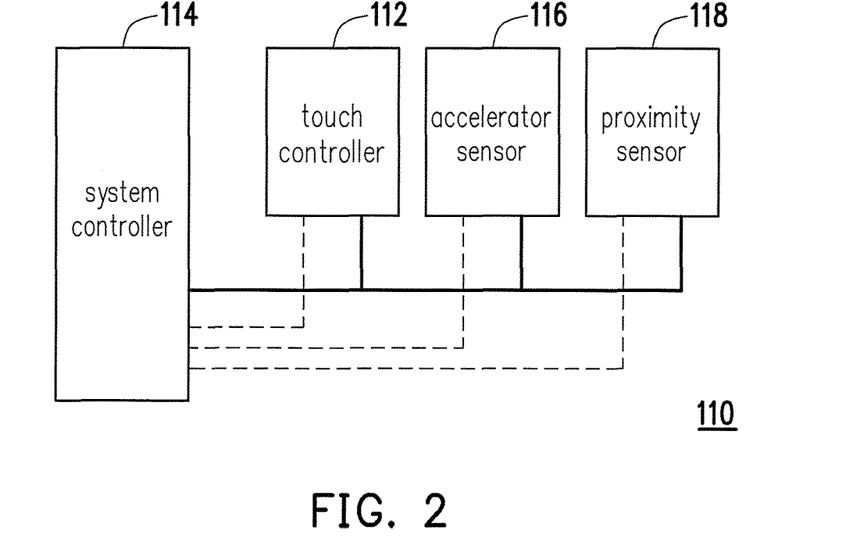
FIG. 2 illustrates a block diagram of a touch controller apparatus according to an exemplary embodiment.
Figure 3:
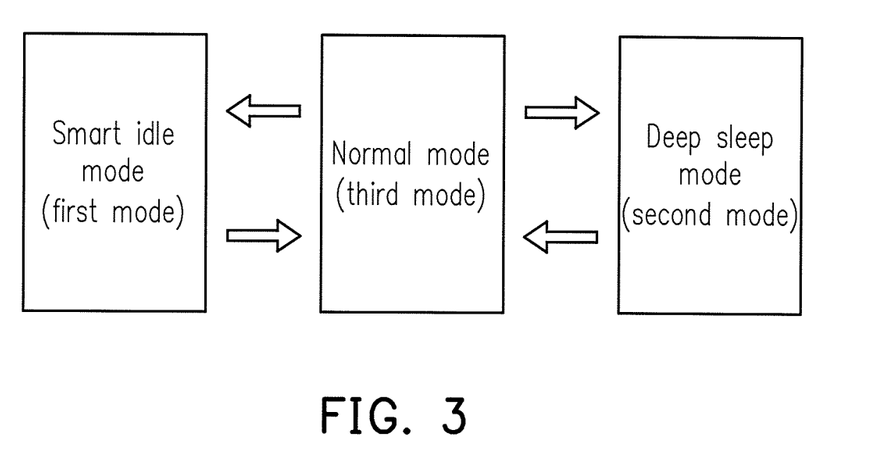
FIG. 3 illustrates operation modes of the touch controller apparatus according to an exemplary embodiment.

FIG. 1 illustrates a schematic diagram of a gesture for waking up an electronic device according to an exemplary embodiment. FIG. 2 illustrates a block diagram of a touch controller apparatus according to an exemplary embodiment. FIG. 3 illustrates operation modes of the touch controller apparatus according to an exemplary embodiment. Referring to FIG. 1 to FIG. 3, an electronic device 100 includes a touch controller apparatus 110, and the touch controller apparatus 110 is configured to sense a gesture of a user 200 performed on the electronic device 100 in the present embodiment. In the present embodiment, the electronic device 100 may be a portable electronic device, such as a notebook computer, a tablet computer, a smart phone, a smart watch, and etc., or a non-portable electronic device, such as a smart television, a desktop computer, a flat panel display, and etc. The invention is not limited thereto.

In the present embodiment, the electronic device 100 may operate in a smart idle mode (a first mode), a deep sleep mode (a second mode), or a normal mode (a third mode) as shown in FIG. 3. In the normal mode, the touch controller apparatus 110 may sense the gesture and report a touch point of the gesture. The electronic device 100 may correspondingly perform an operation related to the gesture. If the electronic device is suspended, the electronic device 100 may goes to the deep sleep mode or the smart idle mode. In the deep sleep mode, the electronic device 100 may do nothing and waste very low power consumption. In the smart idle mode, the electronic device 100 may have limitations and be restricted to detect some special gesture. The power consumption of the smart idle mode is much less than that of the normal mode. In the present embodiment, if the electronic device is suspended, the electronic device 100 may goes to the smart idle mode. The user 200 may wake up the electronic device 100 by using a predefined gesture, such as a swipe gesture or a double-tap gesture, and thereby the electronic device 100 changes from the smart idle mode to the normal mode.

On the other hand, the touch controller apparatus 110 includes a touch controller 112, a system controller 114, an accelerator sensor 116 (a G-sensor), and a proximity sensor 118 (a P-sensor) in the present embodiment. The touch controller 112, the accelerator sensor 116, and the proximity sensor 118 are electrically connected to the system controller 114, respectively. In the present embodiment, if the electronic device 100 is suspended and goes to the smart idle mode, the touch controller 112 may be set to operate in the smart idle mode, and the system controller 114, the accelerator sensor 116, and the proximity sensor 118 may be set to operate in the deep sleep mode.

It should be noted that the operations of the touch controller 112, the system controller 114, the accelerator sensor 116, and the proximity sensor 118 disclosed in the present embodiment are exemplary for description, and the invention is not limited thereto. As shown in FIG. 1, the user 200 wakes up the electronic device 100 by using the double-tap gesture, and thereby the electronic device 100 changes from the smart idle mode to the normal mode according to the double-tap gesture.

To be specific, in the present embodiment, the double-tap gesture firstly wakes up the touch controller 112, such that the touch controller 112 changes from the smart idle mode to the normal mode. Next, the touch controller 112 works in the nominal mode, and wakes up the system controller 114. The system controller 114 accordingly changes from the deep sleep mode to the normal mode. After waking up, the system controller 114 would further wake up the accelerator sensor 116 and the proximity sensor 118 to generate the sensing data. For generating the sensing data, the proximity sensor 118 may detect the presence of nearby objects without any physical contact, and the accelerator sensor 116 may measure proper acceleration, i.e., g-force, of the electronic device 100 relative to the Earth. The accelerator sensor 116 is used in the electronic device 100 so that images on the screen are always displayed upright. In the present embodiment, the system controller 114 controls the electronic device 100 to change from the smart idle mode to the normal mode according to the sensing data generated by one or both of the accelerator sensor 116 and the proximity sensor 118. Accordingly, for waking up the electronic device 100, the sensing data generated by the accelerator sensor 116 and the proximity sensor 118 are taken into consideration in the present embodiment, and thus, erroneous determinations for waking up the electronic device 100 may be reduced.

Figure 4:
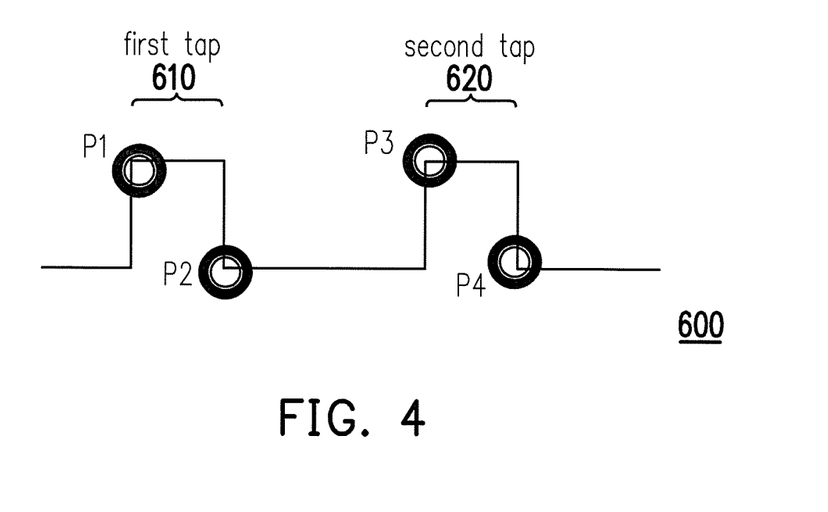
FIG. 4 illustrates a timing diagram of the double-tap gesture according to an exemplary embodiment.
Figure 5:
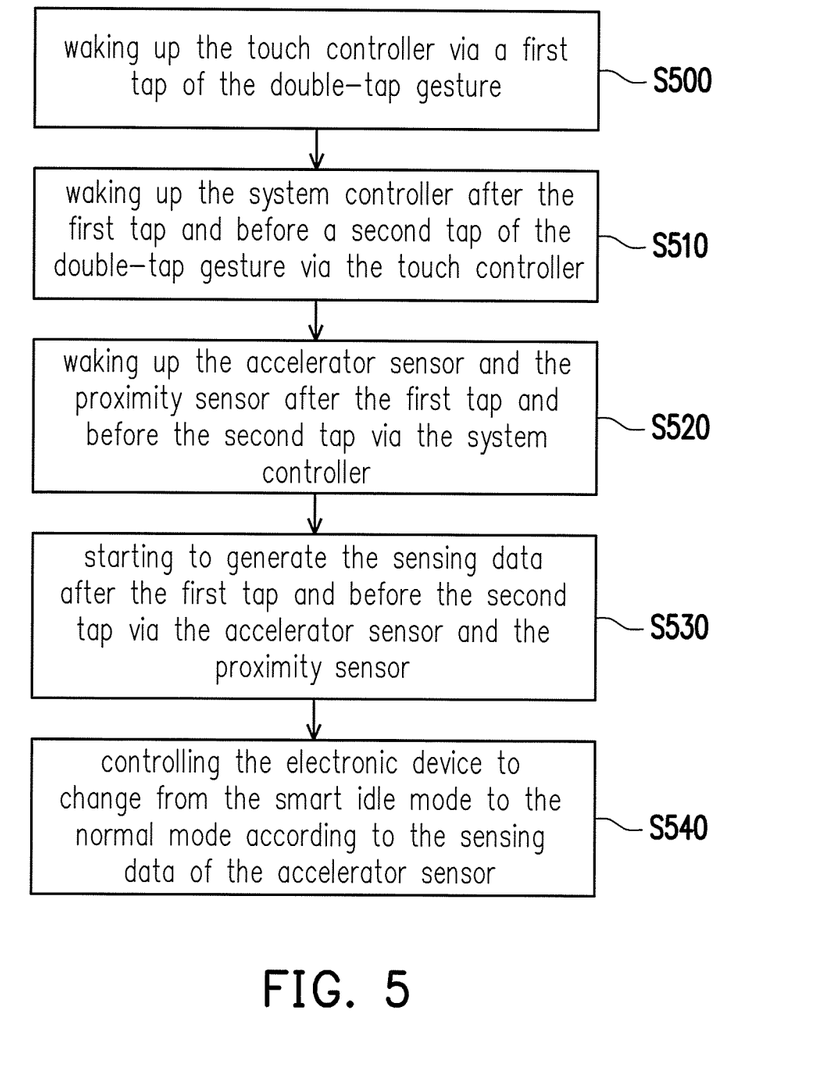
FIG. 5 illustrates a flowchart of a method for waking up an electronic device according to an exemplary embodiment.

FIG. 4 illustrates a timing diagram of the double-tap gesture according to an exemplary embodiment. FIG. 5 illustrates a flowchart of a method for waking up an electronic device according to an exemplary embodiment. Referring to FIG. 1 to FIG. 5, the method for waking up the electronic device of the present embodiment may be applied to the electronic device 100 as shown in FIG. 1, but the invention is not limited thereto. In the present embodiment, the double-tap gesture 600 may includes a first tap 610 and a second tap 620. The first tap 610 touches the electronic device 100 before the second tap 620.

In step S500, the first tap 610 wakes up the touch controller 112. The touch controller 112 changes from the smart idle mode to the normal mode. Next, the touch controller 112 wakes up the system controller 114 after the first tap 610 and before the second tap 620 in step S510. The system controller 114 changes from the deep sleep mode to the normal mode. In step S520, the system controller 114 wakes up at least one sensor, such as one or both of the accelerator sensor 116 and the proximity sensor 118 after the first tap 610 and before the second tap 620. In the present embodiment, both of the accelerator sensor 116 and the proximity sensor 118 are woken up, and thereby changes from the deep sleep mode to the normal mode. Thereafter, the accelerator sensor 116 and the proximity sensor 118 start to generate the sensing data after the first tap 610 and before the second tap 620 in step S530. In step S540, the system controller 114 controls the electronic device 100 to change from the smart idle mode to the normal mode according to the sensing data of the accelerator sensor 116 and the proximity sensor 118. In one exemplary embodiment, the electronic device 100 may be controlled to change modes simply according to the sensing data of one of the accelerator sensor 116 and the proximity sensor 118, and the invention is not limited thereto. Accordingly, the double-tap gesture 600 wakes up the electronic device 100, and thus, the electronic device 100 changes from the smart idle mode to the normal mode.

Besides, the method for waking up the electronic device described in this exemplary embodiment of the invention are sufficiently taught, suggested, and embodied in the embodiments illustrated in FIG. 1 to FIG. 3, and therefore no further description is provided herein.

Figure 6:
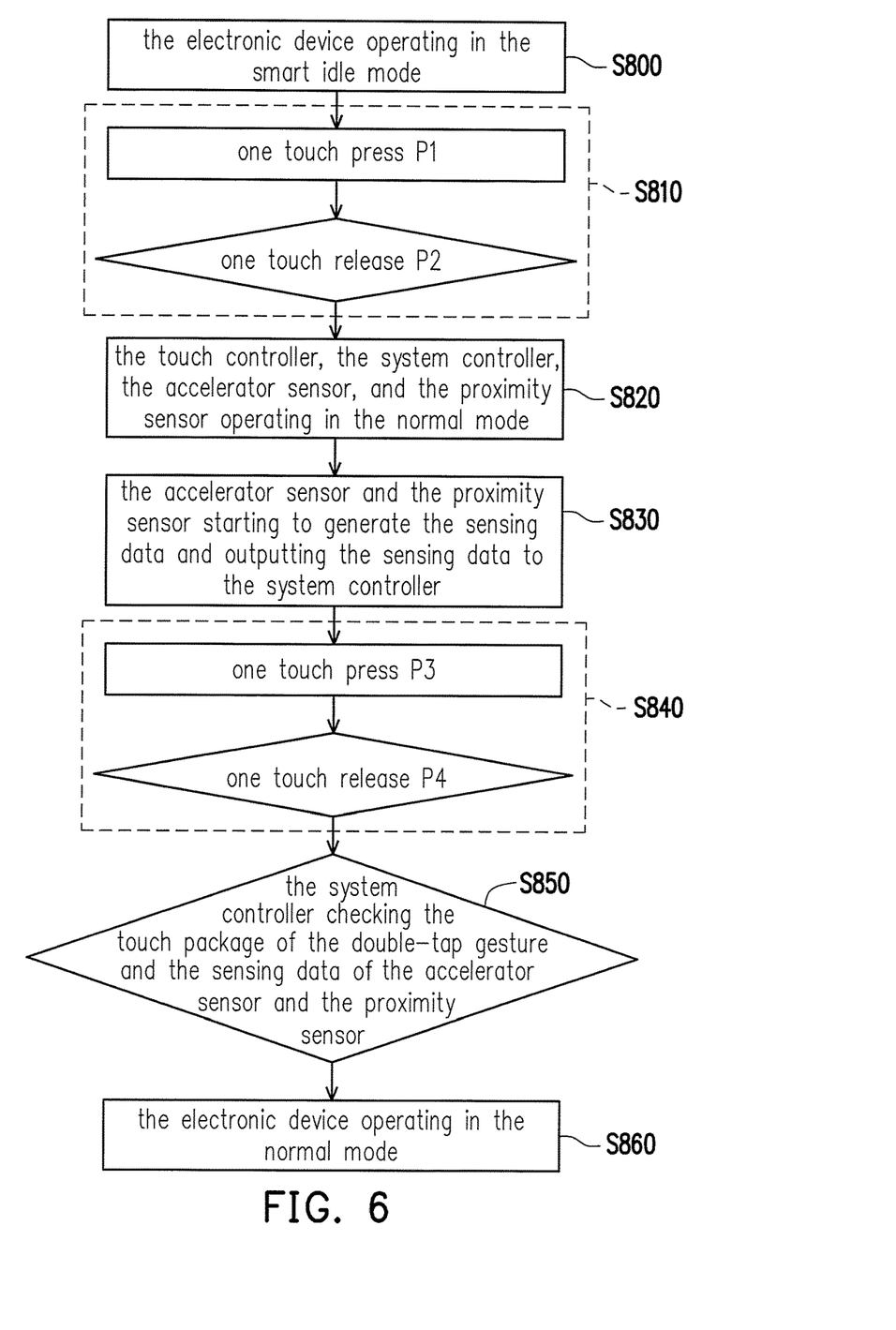
FIG. 6 illustrates a flowchart of a method for waking up an electronic device according to another exemplary embodiment.

FIG. 6 illustrates a flowchart of a method for waking up an electronic device according to another exemplary embodiment. Referring to FIG. 1, FIG. 5 and FIG. 6, the method for waking up the electronic device of the present embodiment may also be applied to the electronic device 100 as shown in FIG. 1, but the invention is not limited thereto. In the present embodiment, the user may also wake up the electronic device 100 by using the double-tap gesture 600.

To be specific, the electronic device 100 may initially operate in the smart idle mode in step S800. At the same time, the touch controller 112 may also operate in the smart idle mode to sense a gesture, such as the double-tap gesture 600. In step S810, the touch controller 112 senses the first tap 610 of the double-tap gesture 600 based on one touch press P1 and one touch release P2. If the touch controller 112 senses the one touch release P2 after the one touch press P1, the touch controller 112 is woken up by the first tap 610, and the flow would go to step S820. By contrast, if the touch controller 112 does not sense the one touch release P2 after the one touch press P1, the flow would return to step S800. The electronic device 100 may still operate in the smart idle mode, and does not wake up.

In step S820, the touch controller 112 wakes up the system controller 114, and the system controller 114 wakes up the accelerator sensor 116 and the proximity sensor 118. Next, the accelerator sensor 116 and the proximity sensor 118 start to generate the sensing data and output the sensing data to the system controller 114 in step S830. In step S840, the touch controller 112 senses the second tap 620 of the double-tap gesture 600 based on one touch press P3 and one touch release P4. If the touch controller 112 senses the one touch release P4 after the one touch press P3, the flow would go to step S850. By contrast, if the touch controller 112 does not sense the one touch release P4 after the one touch press P3, the flow would return to step S800. The electronic device 100 may still operate in the smart idle mode, and does not wake up. The touch controller 112 changes from the normal mode to the smart idle mode. The system controller 114, the accelerator sensor 116 and the proximity sensor 118 change from the normal mode to the deep sleep mode.

In step S850, the system controller 114 determines whether the touch package of the double-tap gesture 600 and the sensing data of the accelerator sensor 116 and the proximity sensor 118 are valid. If the touch package of the double-tap gesture 600 and the sensing data of the accelerator sensor 116 and the proximity sensor 118 are valid, the system controller 114 controls the electronic device 100 to change from the smart idle mode to the normal mode according to the touch package of the double-tap gesture 600 and the sensing data generated by one or both of the accelerator sensor 116 and the proximity sensor 118 in step S860. If the touch package of the double-tap gesture 600 and the sensing data of the accelerator sensor 116 and the proximity sensor 118 are not valid, the flow would return to step S800. For waking up the electronic device 100, the sensing data generated by the accelerator sensor 116 and the proximity sensor 118 are taken into consideration in the present embodiment, and thus, erroneous determinations for waking up the electronic device 100 may be reduced.

Besides, the method for waking up the electronic device described in this exemplary embodiment of the invention are sufficiently taught, suggested, and embodied in the embodiments illustrated in FIG. 1 to FIG. 5, and therefore no further description is provided herein.

Figure 7:
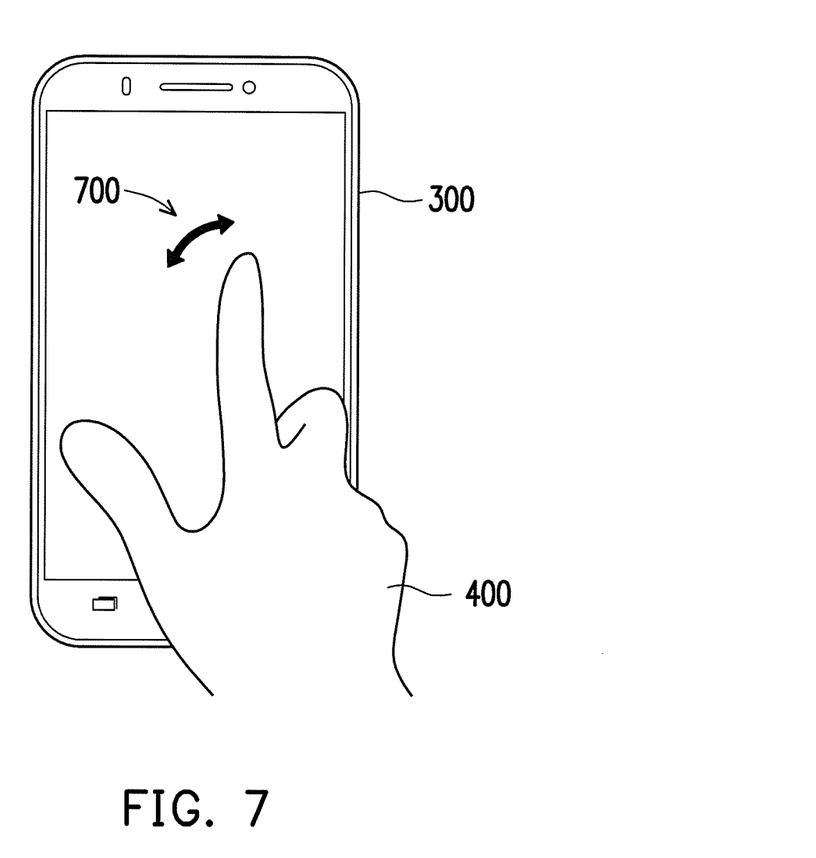
FIG. 7 illustrates a schematic diagram of a gesture for waking up an electronic device according to another exemplary embodiment.
Figure 8:
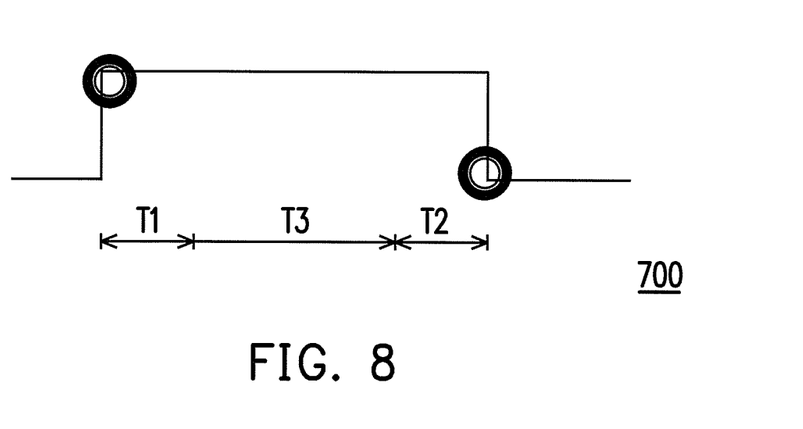
FIG. 8 illustrates a timing diagram of the swipe gesture according to an exemplary embodiment.
Figure 9:
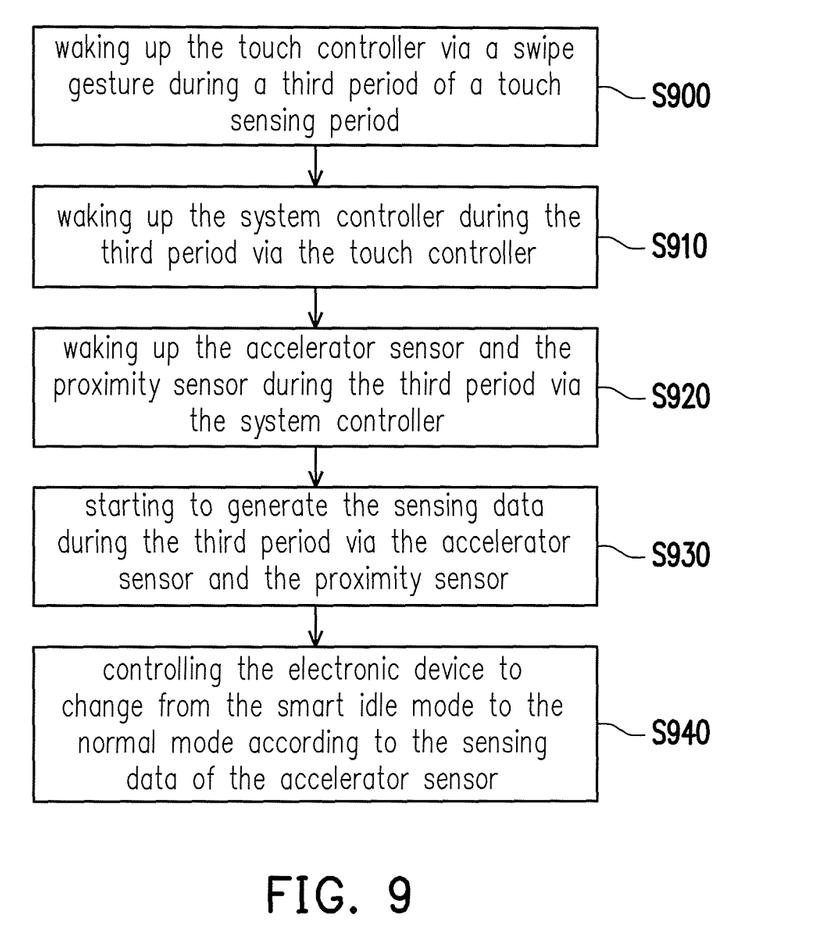
FIG. 9 illustrates a flowchart of a method for waking up an electronic device according to another exemplary embodiment.

FIG. 7 illustrates a schematic diagram of a gesture for waking up an electronic device according to another exemplary embodiment. FIG. 8 illustrates a timing diagram of the swipe gesture according to an exemplary embodiment. FIG. 9 illustrates a flowchart of a method for waking up an electronic device according to another exemplary embodiment. Referring to FIG. 7 to FIG. 9, a method for waking up an electronic device of the present embodiment is similar to that of FIG. 1, FIG. 4 and FIG. 5, and the main difference therebetween, for example, lies in that a gesture of a user 400 for waking up the electronic device 300 is a swipe gesture. Furthermore, the method for waking up the electronic device of the present embodiment may be applied to the electronic device 300 as shown in FIG. 7, but the invention is not limited thereto.

To be specific, the swipe gesture 700 may be performed on the electronic device 300 during a touch sensing period. In the present embodiment, the touch sensing period includes a first period T1, a second period T2, and a third period T3. The third period T3 exists between the first period T1 and the second period T2 as shown in FIG. 8.

In step S900, the swipe gesture 700 wakes up the touch controller 112 during the third period T3 of the touch sensing period, i.e., between the first period T1 and the second period T2. The touch controller 112 changes from the smart idle mode to the normal mode. Next, the touch controller 112 wakes up the system controller 114 during the third period T3 in step S910. The system controller 114 changes from the deep sleep mode to the normal mode. In step S920, the system controller 114 wakes up at least one sensor, such as one or both of the accelerator sensor 116 and the proximity sensor 118 during the third period T3. In the present embodiment, both of the accelerator sensor 116 and the proximity sensor 118 are woken up, and thereby changes from the deep sleep mode to the normal mode. Thereafter, the accelerator sensor 116 and the proximity sensor 118 start to generate the sensing data during the third period T3 in step S930. In step S940, the system controller 114 controls the electronic device 300 to change from the smart idle mode to the normal mode according to the sensing data of the accelerator sensor 116 and the proximity sensor 118. In one exemplary embodiment, the electronic device 300 may be controlled to change modes simply according to the sensing data of one of the accelerator sensor 116 and the proximity sensor 118, and the invention is not limited thereto. Accordingly, the swipe gesture 700 wakes up the electronic device 300, and thus, the electronic device 300 changes from the smart idle mode to the normal mode.

Besides, the method for waking up the electronic device described in this exemplary embodiment of the invention are sufficiently taught, suggested, and embodied in the embodiments illustrated in FIG. 1 to FIG. 3, and therefore no further description is provided herein.

In summary, in the exemplary embodiments of the invention, the system controller controls the electronic device to change from the smart idle mode to the normal mode according to the sensing data generated by one or both of the accelerator sensor and the proximity sensor. For waking up the electronic device, the sensing data generated by the accelerator sensor and the proximity sensor are taken into consideration, and thus, erroneous determinations for waking up the electronic device are reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch controller apparatus, configured to sense one of a plurality of gestures performed on an electronic device, and the touch controller apparatus comprising:
   a touch controller;
   a system controller, electrically connected to the touch controller; and
   at least one sensor electrically connected to the system controller,
   wherein the system controller wakes up the at least one sensor to generate a sensing data, wherein the system controller controls the electronic device to change from a second mode to a third mode according to the sensing data of the at least one sensor,
   wherein in a first mode, the touch controller is restricted to sense the one of the plurality of gestures, the system controller is not operational, the at least one sensor is not operational, and the electronic device is locked;
   in the second mode, the touch controller does not sense the plurality of gestures, the touch controller wakes the system controller, after the system controller wakes the system controller wakes the at least one sensor and the at least one sensor starts sending sensing data to the system controller; and
   in response to the sensing data matching a predetermined condition, the system controller wakes the electronic device in to the third mode,
   in the third mode, the touch controller senses the plurality of gestures, the sensor sends data to the system controller, the display is on and the electronic device is unlocked; and
   wherein the one of the plurality of gestures comprises double taps, a first tap of the double taps wakes up the touch controller, and the touch controller wakes up the system controller and the system controller wakes up the at least one sensor after the first tap of the double taps and before the second tap of the double taps, wherein the at least one sensor starts to generate the sensing data after the first tap of the double taps and before a second tap of the double taps, and wherein the system controller controls the electronic device to change from the second mode to the third mode according to the sensing data of the at least one sensor after the second tap of the double taps.

2. The touch controller apparatus according to claim 1, wherein the at least one sensor comprises at least one of an accelerator sensor and a proximity sensor, and the system controller controls the electronic device to change from the second mode to the third mode according to the sensing data of the at least one of the accelerator sensor and the proximity sensor.

3. The touch controller apparatus according to claim 1, wherein the one of the plurality of gestures is performed on the electronic device during a touch sensing period, the one of the plurality of gestures wakes up the touch controller between a first period and a second period of the touch sensing period, the touch controller wakes up the system controller between the first period and the second period of the touch sensing period, and the system controller wakes up the at least one sensor to generate the sensing data between the first period and the second period of the touch sensing period.

4. The touch controller apparatus according to claim 3, wherein the system controller controls the electronic device to change from the second to the third mode according to the sensing data of the at least one sensor after the touch sensing period.

5. The touch controller apparatus according to claim 1, wherein the first mode is a smart idle mode, the second mode is a deep sleep mode, and the third mode is a normal mode.

6. A method for waking up an electronic device, wherein the electronic device comprises a touch controller apparatus configured to sense one of a plurality of gestures performed on the electronic device, and the touch controller apparatus comprises a system controller, a touch controller, and at least one sensor, and the method comprising:

sensing one of a plurality of gestures, putting the electronic device in a first mode and waking the touch controller;

wherein in the first mode the at least one sensor is off, a display is off, the system controller is off and the electronic device is locked;

in response to the touch controller waking and the touch controller waking the system controller, putting the electronic device in a second mode;

wherein in the second mode system controller wakes the at least one sensor, the touch controller stops sensing the plurality of gestures and the sensor sends sensing data to the system controller;

in response to the sensing data matching a predetermined condition, the electronic device enters a third mode;

wherein in the third mode the touch controller senses one of a plurality of gestures, the sensor sends sensing data to the system controller, the display is on and the electronic device is unlocked;

wherein the one of the plurality of gestures comprises double taps, the step of waking up the touch controller via the one of the plurality of gestures comprises:

waking up the touch controller via a first tap of the double taps, wherein the step of waking up the system controller via the touch controller and the step of waking up the at least one sensor to generate the sensing data via the system controller are performed after the first tap of the double taps and before the second tap of the double taps;

wherein the at least one sensor starts to generate the sensing data after the first tap of the double taps and before a second tap of the double taps;

wherein the step of controlling the electronic device to change from the second mode to the third mode according to the sensing data of the at least one sensor via the system controller is performed after the second tap of the double taps.

7. The method according to claim 6, wherein the at least one sensor comprises at least one of an accelerator sensor and a proximity sensor, and in the step of controlling the electronic device to change from the second mode to the third mode according to the sensing data of the at least one sensor via the system controller, the electronic device is controlled to change from the second mode to the third mode according to the sensing data of the at least one of the accelerator sensor and the proximity sensor.

8. The method according to claim 6, wherein the one of the plurality of gestures is performed on the electronic device during a touch sensing period, the step of waking up the touch controller via the one of the plurality of gestures, the step of waking up the system controller via the touch controller, and the step of waking up the at least one sensor to generate the sensing data via the system controller are performed between the first period and the second period of the touch sensing period.

9. The method according to claim 8, wherein the step of controlling the electronic device to change from the second mode to the third mode according to the sensing data of the at least one sensor via the system controller is performed after the touch sensing period.

10. The method according to claim 6, wherein the first mode is a smart idle mode, the second mode is a deep sleep mode, and the third mode is a normal mode.

* * * * *